US007613554B2

(12) United States Patent
Rollinger et al.

(10) Patent No.: US 7,613,554 B2
(45) Date of Patent: Nov. 3, 2009

(54) SYSTEM AND METHOD FOR DEMONSTRATING FUNCTIONALITY OF ON-BOARD DIAGNOSTICS FOR VEHICLES

(75) Inventors: John Rollinger, Sterling Heights, MI (US); Paul Pietrzyk, Beverly Hills, MI (US); John Smiley, III, Southfield, MI (US); Duncan Borthwick, Plymouth, MI (US); Gregory Sapick, Birmingham, MI (US); Marian Chipa, Dearborn, MI (US); John Harris, Plymouth, MI (US); Robert Grant, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 620 days.

(21) Appl. No.: 11/423,628

(22) Filed: Jun. 12, 2006

(65) Prior Publication Data

US 2007/0288134 A1 Dec. 13, 2007

(51) Int. Cl.
*G01M 17/00* (2006.01)
*G01M 15/00* (2006.01)

(52) U.S. Cl. .......................................... 701/31; 701/33

(58) Field of Classification Search ....................... None
See application file for complete search history.

(56) References Cited

U.S. PATENT DOCUMENTS

| | | | | |
|---|---|---|---|---|
| 4,340,935 A * | 7/1982 | Anlauf et al. | ................. | 701/70 |
| 5,147,206 A * | 9/1992 | Golenski | .................... | 434/219 |
| H1273 H | 1/1994 | Novick | | |
| 5,550,762 A * | 8/1996 | Doll | ........................... | 702/183 |
| 5,798,647 A * | 8/1998 | Martin et al. | ............... | 324/503 |
| 6,014,504 A | 1/2000 | Saine et al. | | |
| 6,226,760 B1 | 5/2001 | Burkhardt et al. | | |
| 6,594,620 B1 | 7/2003 | Qin et al. | | |
| 7,020,803 B2 | 3/2006 | Wolin et al. | | |

* cited by examiner

*Primary Examiner*—Michael J. Zanelli
(74) *Attorney, Agent, or Firm*—Julia Voutyras; Brooks Kushman P.C.

(57) ABSTRACT

A system and method for demonstrating or testing operation of on-board diagnostics in a vehicle include imitating performance degradation of a vehicle hardware component and/or associated vehicle system by dynamically modifying at least one control system parameter value associated with the hardware component in response to a request to demonstrate operation of a selected diagnostic function or a specified performance degradation. Embodiments modify at least one control system parameter value associated with the input/output signal of a sensor/actuator to imitate a specified performance degradation. The diagnostics independently monitor operation of various vehicle control systems and operate to detect the degraded performance without knowledge of, or distinguishing between, whether the performance degradation was caused by an actual hardware component, or by the requested modification to the control system parameter value (s) associated with a particular hardware component.

20 Claims, 2 Drawing Sheets

SYSTEM AND METHOD FOR DEMONSTRATING FUNCTIONALITY OF ON-BOARD DIAGNOSTICS FOR VEHICLES

BACKGROUND

1. Technical Field

The present disclosure relates to systems and methods for testing or demonstrating functionality of vehicle diagnostics.

2. Background Art

Modern vehicles typically include controllers with on-board diagnostic (OBD) software to monitor performance of various vehicle and engine components and to alert the vehicle operator and/or service personnel when a particular component or system has degraded performance. Various prior art strategies for testing or demonstrating functionality of OBD software require special-purpose tools or computers connected to the vehicle controller to simulate various faults by applying a specified voltage or signal, grounding, or short-circuiting controller inputs and/or outputs to simulate a degraded component or system, such as disclosed in U.S. Pat. Nos. 5,798,647 and 6,014,504, for example. Similarly, laboratory testing, bench testing, dynamometer testing, etc. using special-purpose software and/or hardware devices to simulate vehicle operation and various component degradations has been used to validate vehicle diagnostics.

More recently, emphasis has been placed on in-use testing/demonstration of OBD monitor functionality. This in-use, or production vehicle, testing may be performed by replacing a functioning component with a degraded component to demonstrate that the appropriate OBD monitor activates a corresponding diagnostic code in the vehicle controller and/or alerts the operator with a service light or message depending on the particular code. However, there are several major disadvantages to using actual degraded components, including the cost associated with manufacturing special components with various types or ranges of degradations in performance for each different vehicle, and the resources required to replace functioning components with degraded components. For example, demonstration of some OBD monitors may require disassembling an engine to replace a functioning component with a degraded or failed component, which limits the number of times a component replacement can be made to demonstrate a threshold fault. In addition, generating repeatable and functional failures that demonstrate a specific OBD code can be difficult. For example, trying to retard operation of a mechanical component by a specified amount may be possible, but to get the same slow response over the entire production population or even the same vehicle over time may be very difficult to accomplish.

SUMMARY

A system and method for demonstrating or testing operation of on-board diagnostics in a vehicle include changing vehicle operation in response to a request to demonstrate diagnostic functionality to imitate vehicle operation with a degraded hardware component, such as a sensor or actuator. Vehicle operation is changed by dynamically modifying a control system associated with the hardware component in response to the request to demonstrate operation of a selected diagnostic function and controlling the vehicle in response to the modified parameter such that the vehicle operation activates a corresponding diagnostic code.

Disclosed embodiments of a system and method for demonstrating diagnostic functions in a vehicle include receiving data requesting demonstration of a selected diagnostic code associated with a vehicle component and modifying at least one control system parameter associated with the vehicle component to imitate degradation performance of the vehicle component. A monitor function within the vehicle controller independently monitors operation of various vehicle systems, detects degraded performance of the vehicle component, and activates a corresponding diagnostic code. Embodiments may include data to modify (add, subtract, multiply, divide, override/replace, etc.) one or more control system parameter values associated with a particular sensor or actuator at the input/output driver level of the system.

A number of advantages are provided by the teachings of the present disclosure. For example, the disclosed systems and methods provide a general communication and arbitration strategy that communicates a request to demonstrate vehicle diagnostics to a production powertrain control module (PCM) over a communication link, such as a controller area network (CAN). A central communications feature interfaces between the PCM and a connectable diagnostic computer or scan tool to provide secure communication of data requesting a component performance degradation. A central executive feature performs validation tasks and interfaces with the control system features. Each control system feature responds to requests from the executive, provides specific validation of data ranges, verifies current operating conditions are appropriate, modifies control system processing of the sensor/actuator signal to imitate the requested performance degradation, and reports a status back to the executive, which in turn reports the status to the scan tool. The systems and methods operate independently of the corresponding monitors that activate diagnostic codes in response to system performance. The systems and methods use a coherent design architecture making them flexible and scalable to provide manageable expansion and maintenance of a complex software control strategy across multiple vehicle configurations.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, spark-ignited, multi-cylinder port injected internal combustion engine with a variable cam timing device. Those of ordinary skill in the art may recognize similar applications or implementations with other engine/vehicle technologies including compression ignition engines, direct injected and/or port injected engines, and engines having variable valve timing (VVT), for example.

Figure 1:
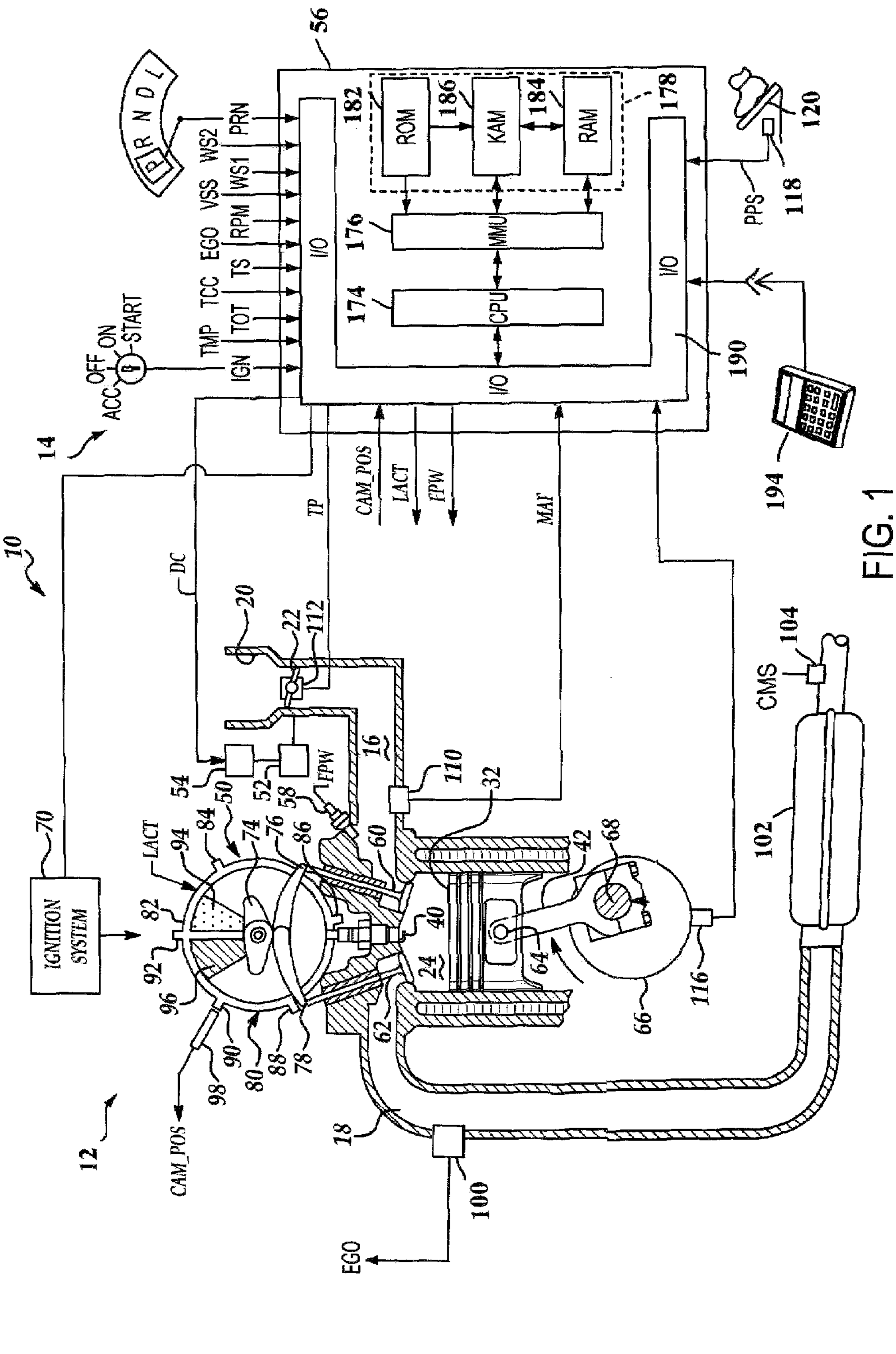
FIG. 1 is a block diagram illustrating operation of a representative vehicle application for a system or method of demonstrating OBD software functionality.

Referring now to FIG. 1, a vehicle 10 includes a multiple cylinder internal combustion engine 12 and an associated engine control system 14. As illustrated, engine control system 14 is in communication with various sensors and actuators. Engine 12 includes an intake manifold 16, an exhaust manifold 18, a throttle body 20, a throttle plate 22, multiple cylinders represented by cylinder 24 with corresponding pistons contained therein as represented by piston 32 and associated spark plugs as represented by spark plug 40, connecting rod assemblies represented by assembly 42, and variable cam timing (VCT) mechanism 50.

In operation, intake manifold 16 is coupled to throttle body 20 with intake air modulated via electronically controlled throttle plate 22. Throttle plate 22 is controlled by electric motor 52 in response to a signal received from ETC driver 54 based on a corresponding control signal (DC) received from a controller 56 generated in response to a requested torque or power via position of accelerator pedal 120 as determined by pedal position sensor 118. A throttle plate position sensor 112 provides a feedback signal (TP) for closed loop control of throttle plate 22. Air inducted into throttle body 20 passes through intake manifold 16 past mass airflow sensor 110, which provides a corresponding signal (MAF) indicative of the mass airflow to controller 56 for use in controlling the engine/vehicle. In addition, controller 56 may communicate with various other sensors to monitor engine operating conditions, such as crankshaft position sensor 116, which may be used to determine engine rotational speed and to identify cylinder combustion based on an absolute, relative, or differential engine rotation speed.

An exhaust gas oxygen sensor 100 provides a signal (EGO) to controller 56 indicative of whether the exhaust gasses are lean or rich of stoichiometry. Depending upon the particular application, sensor 100 may provide a two-state signal corresponding to a rich or lean condition, or alternatively a signal that is proportional to the stoichiometry of the exhaust gases. This signal may be used to adjust the air/fuel ratio, or control the operating mode of one or more cylinders, for example. The exhaust gas is passed through the exhaust manifold and one or more catalysts 102 before being exhausted to atmosphere. An additional EGO sensor 104 may be positioned downstream of the catalyst(s) 102 and provide a corresponding catalyst monitor signal (CMS) to controller 56 used to monitor performance of catalyst(s) 102.

Each cylinder 24 communicates with intake manifold 16 and exhaust manifold 18 via one or more respective intake and exhaust valves represented by intake valve 60 and exhaust valve 62. Cylinder 24 includes a combustion chamber having an associated reciprocating piston 32 operably disposed therein. Piston 32 is connected to connecting rod assembly 42 via a wrist pin 64. Connecting rod 42 is further coupled to crankshaft 66 via a crankpin 68. Ignition timing for ignition of an air-fuel mixture within cylinder 24 is controlled via spark plug 40, which delivers an ignition spark responsive to a signal from distributorless ignition system 70. As well known in the art, ignition timing is typically measured in degrees based on angular position of crankshaft 66 relative to a position corresponding to top dead center (TDC), i.e. the highest point of piston 32 within cylinder 24. For the port fuel injection engine illustrated, intake manifold 16 includes a fuel injector 58 coupled thereto for delivering fuel in proportion to the pulse width of one or more signals (FPW) from controller 56. Fuel is delivered to fuel injector 58 by a conventional fuel system (not shown) including a fuel tank, fuel pump, and fuel rail, for example.

As also shown in FIG. 1, engine 12 may include a variable cam timing (VCT) mechanism 50 to vary the actuation time of intake and exhaust valves 60, 62 for each cylinder 24. VCT mechanism 50 cooperates with corresponding lobes of a camshaft 74, which are shown communicating with rocker arms 76, 78 for variably actuating valves 60, 62. Camshaft 74 is directly coupled to housing 80, which forms a toothed cam wheel 82 having teeth 84, 86, 88, 90, 92. Housing 80 is hydraulically coupled to an inner shaft (not shown), which is in turn directly linked to camshaft 74 via a timing chain (not shown). Therefore, housing 80 and camshaft 74 rotate at a speed substantially equivalent to the inner camshaft. The inner camshaft rotates at a constant speed ratio relative to crankshaft 66. The position of camshaft 74 relative to crankshaft 66 can be varied by hydraulic pressure in advance chamber 94 and/or retard chamber 96. By allowing high-pressure hydraulic fluid to enter advance chamber 94, the relative relationship between camshaft 74 and crankshaft 66 is advanced. Thus, intake valve 60 and exhaust valve 62 open and close at a time earlier than normal relative to crankshaft 66. Similarly, by allowing high-pressure hydraulic fluid to enter retard chamber 96, the relative relationship between camshaft 74 and crankshaft 66 is retarded. Thus, intake valve 60 and exhaust valve 62 open and close at a time later than normal relative to crankshaft 66.

Teeth 84, 86, 88, 92 of cam wheel 82 are coupled to housing 80 and camshaft 74 and allow for measurement of relative position of camshaft 74 via cam timing sensor 98 which provides signal CAM_POS to controller 56. Tooth 90 is used for cylinder identification. As illustrated, teeth 84, 86, 88, 92 may be evenly spaced around the perimeter of cam wheel 82. Controller 56 sends control signal LACT to a conventional solenoid spool valve (not shown) to control the flow of hydraulic fluid into either advance chamber 94, retard chamber 96, or neither. Relative position of camshaft 74 can be measured in general terms, using the time, or rotation angle between the rising edge of a PIP signal and receiving a signal from one of teeth 84, 86, 88, 90, or 92 as is known.

Controller 56 has a microprocessor 174, also referred to as a central processing unit (CPU), in communication with memory management unit (MMU) 176. MMU 176 controls the movement of data among the various computer readable storage media 178 and communicates data to and from CPU 174. Computer readable storage media 178 preferably include volatile and nonvolatile storage in read-only memory (ROM) 182, random-access memory (RAM) 184, and keep-alive memory (KAM) 186, for example. KAM 186 may be used to store various operating variables or control system parameter values while CPU 184 is powered down. Computer-readable storage media 178 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions or code, used by CPU 174 in controlling the engine or vehicle into which the engine is mounted and for performing on-board diagnostic (OBD) monitoring of various engine/vehicle features. Computer-readable storage media 178 may also include floppy disks, CD-ROMs, hard disks, and the like.

CPU 24 communicates with various engine/vehicle sensors and actuators via an input/output (I/O) interface 190 that may be implemented as a single integrated interface providing various raw data or signal conditioning, processing, and/or conversion, short-circuit protection, and the like. Alternatively, one or more dedicated hardware or firmware chips may be used to condition and process particular signals before being supplied to CPU 174. Examples of items that may be directly or indirectly actuated under control of CPU 174, through I/O interface 190, are fuel injection timing, rate, and duration, throttle valve position, spark plug ignition timing (for spark-ignition engines), intake/exhaust valve timing and/or duration, front-end accessory drive (FEAD) components such as an alternator, air conditioning compressor, and the like. Sensors communicating input through I/O interface 190 may be used to indicate crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), or catalytic converter performance (CMS), for example.

Some controller architectures do not contain an MMU 176. If no MMU 176 is employed, CPU 174 manages data and connects directly to ROM 182, RAM 184, and KAM 186. Of course, more than one CPU 174 may be used to provide engine control and diagnostics and controller 56 may contain multiple ROM 182, RAM 184, and KAM 186 coupled to MMU 176 or CPU 174 depending upon the particular application.

Controller 56 includes software and/or hardware implementing control logic to control the engine/vehicle and to demonstrate functionality of on-board diagnostics as described herein. In one embodiment, controller 56 changes or modifies vehicle operation in response to a request to demonstrate diagnostic functionality such that the engine/vehicle operates as if a specified vehicle sensor or actuator has a specified performance degradation. Controller 56 includes software and/or hardware implementing one or more on-board diagnostic monitors that independently monitor operation of the engine/vehicle and activate a corresponding diagnostic code based on the modified vehicle operation without regard to whether the operation resulted from an actual vehicle component degradation or the requested change in operation to demonstrate diagnostic functionality. The request to demonstrate diagnostic functionality and any resulting diagnostic codes may be communicated to controller 56 over a communication link, such as a controller area network (CAN), from a selectively connectable microprocessor-based diagnostic tool 194. As described in greater detail below, diagnostic tool 194 may provide a text-based or graphical user interface (GUI) to select an available diagnostic code or component degradation to demonstrate, communicate corresponding data to controller 56, and receive diagnostic codes and status information from controller 56 for presentation to a user.

Figure 2:
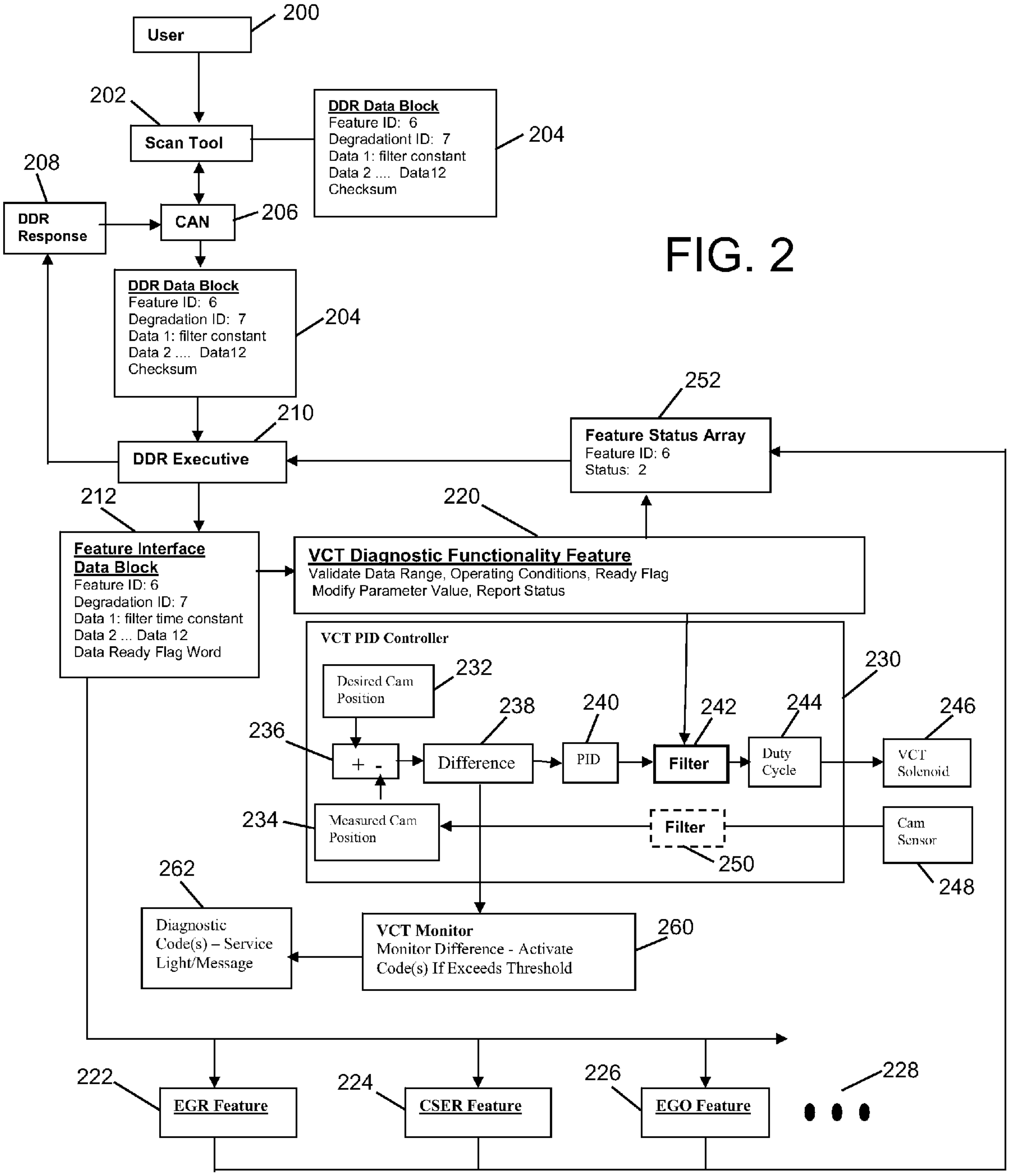
FIG. 2 is a block diagram/flow chart illustrating diagnostic functionality demonstration for a representative requested component performance degradation in a variable cam timing device.

A diagram illustrating operation of a system and method for demonstrating functionality of on-board diagnostics is shown in FIG. 2. The control strategies and/or logic illustrated represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Preferably, the control logic is implemented primarily in software executed by a microprocessor-based vehicle, engine, and/or powertrain controller, such as controller 56 (FIG. 1). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, and/or optical storage to keep executable instructions and associated calibration information, operating variables, and the like.

FIG. 2 is a block diagram/flow chart illustrating diagnostic functionality demonstration for a representative requested component performance degradation in a variable cam timing device. User 200 connects a diagnostic computer or scan tool 202 to the powertrain control module 56 (FIG. 1). Scan tool 202 preferably includes a programmed microprocessor with memory that presents the user with a text-based or graphical user interface having a number of context sensitive menus. User 200 selects an available diagnostic demonstration feature corresponding to a monitored vehicle control system and/or hardware device depending upon the particular application and implementation. As an example, user 200 may select the variable cam timing (VCT) feature and be presented with available performance degradations, such as "Cylinder Bank 1 Slow Response" or "Cylinder Bank 2 Slow Response". Vehicle system or specific hardware component performance degradations will vary based on the sensor(s) and/or actuator(s) associated with the selected diagnostic demonstration feature. In this example, user 200 is prompted to enter a value for the associated filter constant or time constant. The menu prompts may include valid data ranges for a specified performance degradation.

Scan tool 202 encodes the input entered by user 200 and generates a fixed length diagnostic demonstration request (DDR) data block 204. Data block 204 has a fixed length regardless of the particular requested performance degradation with additional data bytes filled or padded with zero values to improve flexibility and scalability of the diagnostic demonstration/test feature. However, in an alternative embodiment the data block could be of variable length depending on the amount of data to transmit for the specific DDR being requested. In this embodiment, data block 204 includes a fixed length of 24 bytes of data representing the feature ID, degradation ID, data values and scaling, and checksum or other error detection and/or correction information. Scan tool 202 then communicates data block 204 representing the specific request to demonstrate OBD functionality using an appropriate protocol, such as the controller area network (CAN) protocol 206, to the powertrain control module 56 (FIG. 1). The portion of the CAN protocol executing in the PCM receives data block 204 and writes or stores it to a location in volatile memory of the PCM as designated by an associated memory location pointer. This pointer can be stored within the scan tool memory or retrieved via an earlier request for the pointer location over the communication link. DDR executive instructions or code 210 periodically reads the designated memory block to determine if new data have been received from scan tool 202. When new data are detected, executive 210 performs data validation using the checksum or other error detection strategy. Validation may also include reading feature status array 252 to determine what features are available and the current status of each, and may limit diagnostic demonstration to a limited number of features. In one embodiment, executive 210 disables any feature that provides a status to status array 252 during a predetermined time period after an ignition key cycle, but does not provide a status during each subsequent reporting period as well as disabling any feature that does not provide a status during a predetermined time period after an ignition key cycle or PCM power-up. Various other validity checks may be performed depending upon the particular application and implementation. Valid data are then decoded and may be converted to floating point values using scaling information within data block 204 with the resulting data written to or stored in a feature interface data block 212 at another location in volatile PCM memory along with a data ready flag word. The flag word may be set to a specific binary value selected to provide additional error detection based on a predetermined bit pattern such as decimal 170 (alternating 1's and 0's), for example. DDR executive 210 may disable all diagnostic functionality features if communication with scan tool 202 is lost at any time during the process. Executive 210 may also provide a predetermined time-out period for a particular diagnostic functionality feature to be active.

Each of the available diagnostic functionality features, including variable cam timing feature (VCT) 220, exhaust gas recirculation (EGR) feature 22, cold start emissions reduction (CSER) feature 224, and exhaust gas oxygen (EGO) feature 226, or other feature(s) 228 periodically monitors the feature interface memory location holding data block 212. When the feature ID corresponds to the feature and the data ready flag is set, the corresponding feature becomes active. In the representative example of FIG. 2, VCT feature 220 becomes active based on the feature ID (6) and reads the degradation ID (7) and corresponding data values. Each feature interfaces and dynamically modifies a corresponding control system or controller 230 in response to the request to demonstrate diagnostics to change the operation of the vehicle. In this embodiment, VCT feature 220 validates the data range for the requested degradation along with current operating conditions to determine if the degradation should be performed. VCT feature 220 then modifies at least one control system parameter value, which in this example is a delay or time constant associated with filter 242 of the VCT controller 230, based on data within data block 212. VCT controller 230, which is also implemented primarily in software executing in the PCM, controls the vehicle variable cam timing using the modified parameter value so that the vehicle operates in a manner similar to operation resulting from a slow response of VCT solenoid 246.

VCT controller 230 is a closed-loop feedback control system that controls a vehicle actuator (VCT solenoid 246) in response to feedback from a corresponding vehicle sensor (cam sensor 248) in an attempt to provide a desired cam position 232. The desired value 232 is determined from lookup tables to achieve a desired performance, fuel economy, and emissions. Desired value 232 is compared to the measured position 234 at block 236 with the difference 238 acted on by a proportional-integral-derivative (or similar) controller 240 to reduce the difference 238. The output of PID function 240, which represents a typical Proportional/Integral/Derivative controller, is filtered as represented by block 242 using the modified parameter value received from scan tool 202 with a resulting duty cycle 244 determined and output to VCT solenoid 246. VCT feature 220 periodically reports its status to a feature status array 252 and in this case reports a status value of "2" indicating that it is in-process toward the target degradation value. Status array 252 is read by executive 210, which reports an overall diagnostic response based on all available features to location 264 for communication back to user 200 via CAN protocol 206 and scan tool 202. Various other status information may be reported including: feature inactive; request invalid; target degradation achieved; conditions not met or parameters out of range; error; or parameter value not changed due to hardware or software condition that makes change undesirable, etc.

An independent diagnostic monitor implemented by VCT monitor 260 continually monitors various operating parameters and/or conditions associated with the VCT system and activates corresponding diagnostic codes that are stored in non-volatile PCM memory as represented by block 262. Depending on the particular code, a service light or message may be displayed to the vehicle operator. The PCM memory may include a history of the most recently activated codes that can be accessed using an appropriate function of scan tool 202. In this example, VCT monitor function 260 compares the difference 238 to a corresponding threshold and activates a corresponding diagnostic code if the value exceeds the threshold for a predetermined time period indicating an over-advanced or over-retarded cam. In this example, the slow response diagnostic functionality request modified the constant for filter 242 resulting in a larger difference 238 to activate the diagnostic code. It should be noted that VCT monitor 260 is not aware of the request to demonstrate diagnostic functionality and does not determine whether the difference 238 resulted from degraded performance of VCT solenoid 246 or from the requested modification of the control system parameter.

Depending upon the particular control system and requested diagnostic function, other system parameter values may be dynamically modified with the vehicle controlled in response to the modified value(s) to test/demonstrate the OBD functionality. Other than response time variation for sensors or actuators, performance degradations may include drift or offset, constant voltage (or no voltage), and override of a value. For example, one or more sensor inputs may include an optional filter 250 or other modifier with parameter values processed to add noise to the signal input, add/subtract a constant offset, or override the signal value and replace with a designated value, for example.

As such, the disclosed system and method for demonstrating OBD functionality use a coherent design architecture making them flexible and scalable to provide manageable expansion and maintenance of a complex software control strategy across multiple vehicle configurations. The embodiments provide a general communication and arbitration strategy that communicates a request to demonstrate vehicle diagnostics to a production powertrain control module (PCM) over a communication link, such as a controller area network (CAN) to provide in-use testing/demonstration of vehicle diagnostics by controlling the vehicle using a modified control system parameter value so that vehicle operation is similar or identical to operation using a sensor or actuator with degraded performance.

While the best mode has been described in detail, those familiar with the art will recognize various alternative designs and embodiments within the scope of the following claims.

What is claimed:

1. A method for demonstrating operation of on-board diagnostics in a vehicle, the method comprising:

dynamically modifying at least one control system parameter value associated with a vehicle hardware component in response to a request to demonstrate operation of the diagnostics; and controlling the vehicle using the at least one modified parameter value to imitate performance degradation of the vehicle hardware component.

2. The method of claim 1 wherein dynamically modifying comprises modifying a time constant associated with processing a signal for the vehicle hardware component.

3. The method of claim 1 wherein dynamically modifying comprises adding a predetermined value to the at least one control system parameter value to imitate sensor drift of the vehicle hardware component.

4. The method of claim 1 wherein dynamically modifying comprises replacing the at least one control system parameter value with a value specified in the request to demonstrate operation of the diagnostics.

5. The method of claim 1 further comprising:

connecting a microprocessor-based diagnostic tool to a vehicle control module to communicate the request to demonstrate operation of the diagnostics to the vehicle control module.

6. The method of claim 5 wherein the diagnostic tool communicates a fixed size data block to the vehicle control module regardless of the performance degradation being imitated.

7. The method of claim 1 wherein dynamically modifying comprises modifying a parameter value associated with processing an input signal from a vehicle sensor.

8. The method of claim 1 wherein dynamically modifying comprises modifying a parameter value used to generate an output signal for a vehicle actuator.

9. The method of claim 1 wherein the request is communicated to a vehicle control module by a microprocessor-based diagnostic tool, the method further comprising communicating a status for the performance degradation being imitated from the vehicle control module to the diagnostic tool.

10. The method of claim 1 wherein the request is communicated to a vehicle control module by a microprocessor-based diagnostic tool and wherein dynamically modifying a parameter value and controlling the vehicle in response to the parameter value are disabled when the diagnostic tool loses communication with the vehicle control module.

11. The method of claim 1 further comprising:

independently monitoring vehicle operation and activating a diagnostic code in response to vehicle operation using the at least one modified parameter value without knowledge of, or distinguishing between, whether degraded performance was caused by degradation of the vehicle hardware component or by the request to demonstrate diagnostic functionality.

12. The method of claim 1 wherein dynamically modifying comprises modifying a parameter value associated with at least one of variable cam timing, exhaust gas recirculation, and an exhaust gas oxygen sensor.

13. The method of claim 1 further comprising:

disabling any diagnostic demonstration feature that provides a status during a predetermined time period after an ignition key cycle, but does not provide a status during each subsequent reporting period; and disabling any diagnostic demonstration feature that does not provide a status during a predetermined time period after an ignition key cycle.

14. A system for demonstrating operation of on-board diagnostics in a vehicle having an internal combustion engine, the system comprising:

at least one sensor for providing a signal corresponding to a current vehicle operating condition;

at least one actuator for positioning a vehicle component;

a control module in communication with the at least one sensor and at least one actuator, the control module modifying at least one control system parameter value associated with the at least one sensor and/or the at least one actuator in response to a request to demonstrate operation of the on-board diagnostics, and controlling the vehicle based on the modified value to imitate degraded performance of the at least one sensor and/or at least one actuator.

15. The system of claim 14 further comprising:

a microprocessor-based diagnostic tool connectable to the control module to communicate the request to demonstrate operation of the on-board diagnostics.

16. The system of claim 14 wherein the control module modifies a parameter value to vary response time of the at least one actuator.

17. The system of claim 16 wherein the parameter value corresponds to a time constant associated with the at least one sensor.

18. The system of claim 14 wherein the on-board diagnostics function in response to only vehicle operation independently of any request to demonstrate diagnostic functionality.

19. A computer readable storage medium having stored data including instructions executable by a computer to control a vehicle to demonstrate functionality of on-board diagnostics for the vehicle, the computer readable storage medium comprising:

instructions for changing vehicle operation in response to a request to demonstrate functionality of the on-board diagnostics by changing at least one parameter value used to control the vehicle such that the vehicle operates similar to operation using a degraded component, the vehicle operation activating the on-board diagnostics to demonstrate functionality.

20. The computer readable storage medium of claim 19 wherein the instructions for changing vehicle operation comprise instructions for modifying a vehicle control system parameter value and instructions for controlling the vehicle in response to the modified control system parameter value.

* * * * *

UNITED STATES PATENT AND TRADEMARK OFFICE
CERTIFICATE OF CORRECTION

PATENT NO. : 7,613,554 B2
APPLICATION NO. : 11/423628
DATED : November 3, 2009
INVENTOR(S) : Rollinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Nineteenth Day of October, 2010

David J. Kappos

David J. Kappos
*Director of the United States Patent and Trademark Office*